United States Patent
Marya et al.

(10) Patent No.: US 12,241,561 B2
(45) Date of Patent: *Mar. 4, 2025

(54) HARD AND LUBRICIOUS VALVE SURFACES, MATERIAL COMPOSITIONS AND SEQUENCES OF MANUFACTURING

(71) Applicant: Cameron International Corporation, Houston, TX (US)

(72) Inventors: Manuel Marya, Sugar Land, TX (US); Ronald Manson, Spring, TX (US); Christian Meade, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,739

(22) Filed: Feb. 9, 2024

(65) Prior Publication Data
US 2024/0247729 A1 Jul. 25, 2024

Related U.S. Application Data

(63) Continuation of application No. 17/225,447, filed on Apr. 8, 2021, now Pat. No. 11,898,651, which is a
(Continued)

(51) Int. Cl.
*F16K 25/00* (2006.01)
*C10M 103/04* (2006.01)
(Continued)

(52) U.S. Cl.
CPC ......... *F16K 25/005* (2013.01); *C10M 103/04* (2013.01); *C10M 125/02* (2013.01);
(Continued)

(58) Field of Classification Search
None
See application file for complete search history.

(56) References Cited

U.S. PATENT DOCUMENTS

| 5,100,565 A | 3/1992 | Fujiwara et al. |
| 5,829,735 A | 11/1998 | Ikeda |

(Continued)

OTHER PUBLICATIONS

Friedman, et al., "Fabrication of self-lubricating cobalt coatings on metal surfaces," Nanotechnology, vol. 18, No. 11, 2007, 115703-8.
(Continued)

*Primary Examiner* — Daniel J. Schleis
(74) *Attorney, Agent, or Firm* — Jeffrey D. Frantz

(57) ABSTRACT

The disclosure provides for a valve including a surface movably engaged with another surface. A coating is on the surface and is characterized by: a CoF of less than 0.1; a hardness in excess of 1,200 HVN; impermeability to liquids at pressures ranging from 15 and 20,000 psi; a surface finish of 63 or less; and a thickness ranging from 0.5 to 20 mils. The disclosure provides for material constructions including a continuous phase, including a transition metal, and a discontinuous phase, including a solid dry lubricant. The disclosure also provides for a method of depositing a coating that includes depositing a first layer of a coating onto a surface using electroplating, electroless plating, thermal spraying, or cladding, and then depositing a second layer of the coating onto a surface of the first layer using sputtering, ion beam, plasma enhanced chemical vapor deposition, cathodic arc, or chemical vapor deposition.

20 Claims, 7 Drawing Sheets

Related U.S. Application Data continuation of application No. 16/183,388, filed on Nov. 7, 2018, now Pat. No. 10,995,871.

(51) Int. Cl.

| | | |
|---|---|---|
| *C10M 125/02* | (2006.01) | |
| *C10M 125/04* | (2006.01) | |
| *C10M 125/10* | (2006.01) | |
| *C10M 125/22* | (2006.01) | |
| *C10M 171/06* | (2006.01) | |
| *C23C 28/00* | (2006.01) | |
| *C23C 28/02* | (2006.01) | |
| *F16K 3/36* | (2006.01) | |
| *F16K 5/06* | (2006.01) | |
| *C10N 30/00* | (2006.01) | |
| *C10N 30/12* | (2006.01) | |
| *C10N 50/00* | (2006.01) | |
| *C10N 50/08* | (2006.01) | |

(52) U.S. Cl.
CPC ........ *C10M 125/04* (2013.01); *C10M 125/10* (2013.01); *C10M 125/22* (2013.01); *C10M 171/06* (2013.01); *C23C 28/027* (2013.01); *C23C 28/347* (2013.01); *F16K 3/36* (2013.01); *F16K 5/0657* (2013.01); *C10M 2201/041* (2013.01); *C10M 2201/05* (2013.01); *C10M 2201/062* (2013.01); *C10M 2201/066* (2013.01); *C10M 2201/087* (2013.01); *C10N 2030/12* (2013.01); *C10N 2030/26* (2020.05); *C10N 2050/023* (2020.05); *C10N 2050/08* (2013.01); *Y10T 428/12007* (2015.01)

(56) References Cited

U.S. PATENT DOCUMENTS

| | | |
|---|---|---|
| 5,934,321 A | 8/1999 | Miya et al. |
| 6,517,339 B1 | 2/2003 | Miya et al. |
| 6,893,003 B2 | 5/2005 | Gilbert |
| 6,904,935 B2 | 6/2005 | Welty et al. |
| 7,108,012 B2 | 9/2006 | Rosko et al. |
| 7,134,452 B2 | 11/2006 | Hiroshi et al. |
| 7,188,562 B2 | 3/2007 | Hansen et al. |
| 8,679,400 B2 | 3/2014 | Takayama |
| 8,919,371 B2 | 12/2014 | Moeller et al. |
| 10,995,871 B2 * | 5/2021 | Marya ................. C10M 125/04 |
| 2005/0145817 A1 | 7/2005 | Corp et al. |
| 2012/0261603 A1 | 10/2012 | Kahn et al. |
| 2016/0025231 A1 | 1/2016 | Watanabe et al. |
| 2020/0141509 A1 | 5/2020 | Marya et al. |

OTHER PUBLICATIONS

Ripoll, et al., "Tribological behavior of self-lubricating materials at high temperatures," International Materials Reviews, Dec. 2017, pp. 309-340.

Berman, D. et al., "Graphene: a new emerging lubricant", Materials Today, 2014, 17(1), pp. 31-42.

Gupta, S. et al., Ambient and 550° C. tribological behavior of select MAX phases against Ni-based superalloys, Wear, 2008, 265 (3-4), pp. 270-278.

Kovacik, J. et al., "Effect of composition on friction coefficient of Cu-graphite composites", Wear, 2008, 265 (3-4), pp. 417-421.

Jiang, G. et al., "Tribological behavior of a novel fullerene complex", Wear, 2008, 264 (3-4), pp. 264-269.

\* cited by examiner

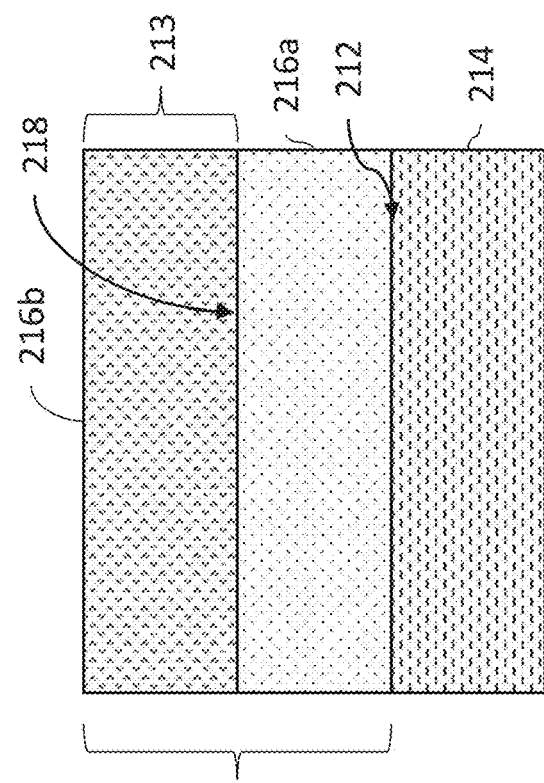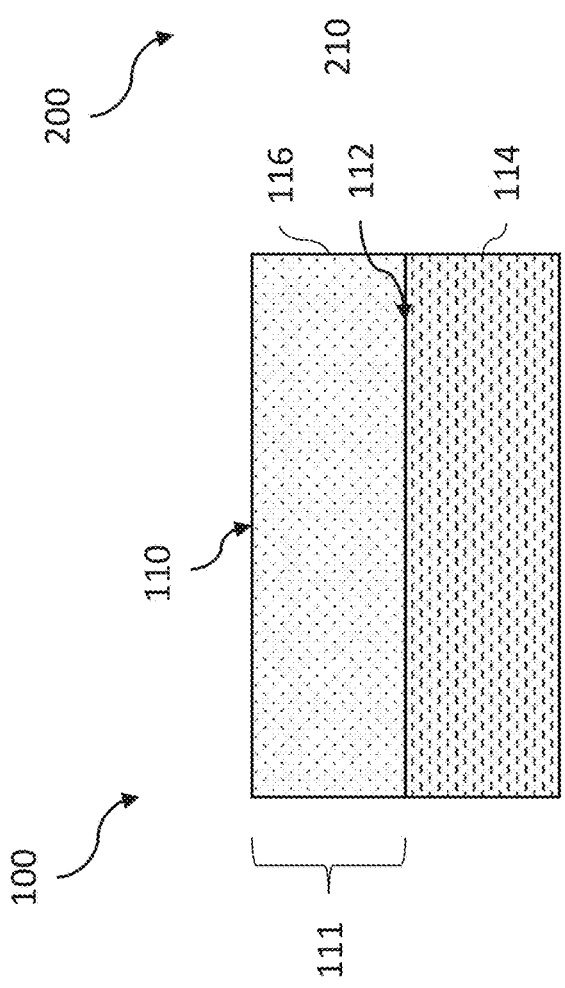

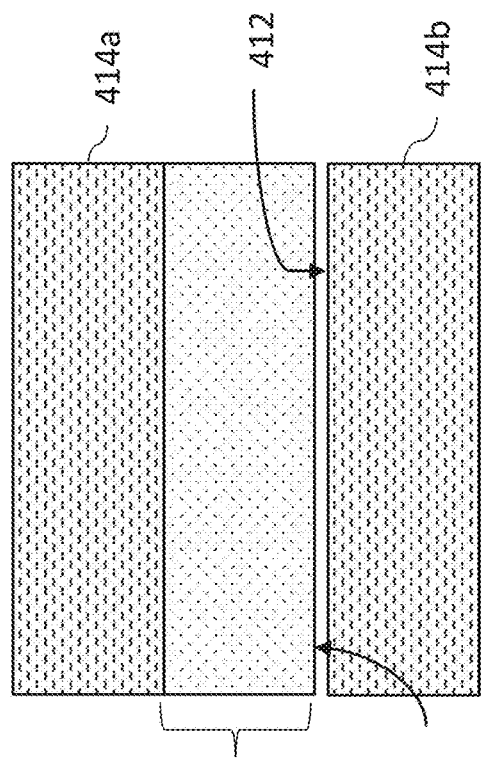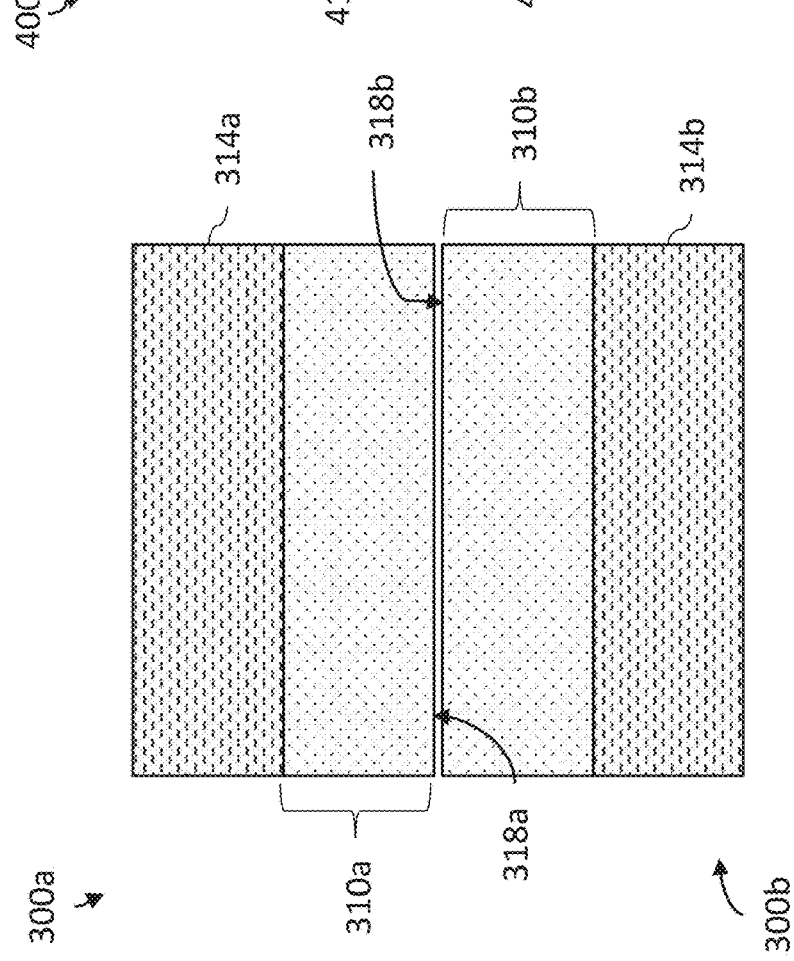

HARD AND LUBRICIOUS VALVE SURFACES, MATERIAL COMPOSITIONS AND SEQUENCES OF MANUFACTURING

CROSS-REFERENCE TO RELATED APPLICATIONS

This application is a Continuation of U.S. application Ser. No. 16/183,388, filed on Nov. 7, 2018, and U.S. application Ser. No. 17/225,447, filed on Apr. 8, 2021, both of which are incorporated herein by reference in their entirety.

FIELD

The present disclosure relates to hard and lubricious valve surfaces, hard and lubricious material compositions, apparatus and systems including the same, and to methods of making and using the same, including sequences of manufacturing the same.

BACKGROUND

Components that, when in operation, have contacting surfaces that are in relative motion typically experience abrasive wear on the surfaces caused by the frictional engagement therebetween. Such components may also experience corrosion, particularly when operating under relatively harsh conditions, such as in various oil and gas exploration, drilling, and production environments. Examples of such harsh conditions include those having sour or $H_2S$-containing gases under high-partial pressures, high-chloride concentrations (high salinity) above ambient temperature, high-$CO_2$ partial pressures, and combinations of these conditions. Additional examples of harsh conditions include warm and oxygenated aqueous environments, as are especially encountered when continuously injecting untreated seawater in an underground reservoir. These conditions are considered harsh because they are corrosive to typical metallic materials and can lead to various forms of degradation over time, including loss of thickness, pitting, crevices, cracking under static and/or cyclic stress, which are all potential causes of uncontrolled loss of fluids through sealing surfaces or metallic walls.

Some such components that are often operated in harsh environments are valves, including ball valves. These ball valves may be positioned at surface, subsea, and/or downhole, in all cases serving a similar function of flow and/or pressure control. Ball valves use a hollow, perforated and pivoting ball to control fluid flow therethrough. Typically, in the open position the hole through the ball is aligned with the fluid flow, and in the closed position the ball is pivoted by 90° relative to the open position such that the hole through the ball is out of alignment with the fluid flow. Other valves that are often operated in harsh environments, and may include linear perforated pistons as an alternative to ball/seat assemblies, include flow control valves, safety valves, formation isolation valves, and subsea lubricator valves. Flow control valves are typically used in completion to selectively control multiple zones, and downhole safety valves are used to provide for emergency closure in wellbores. These two types of valves are usually actually actuated by hydraulic pressure, occasionally via electrical actuations, are cylindrical, and typically utilize linear piston tubes, either selectively perforated to allow radial flow or non-perforated to directly actuate a flapper. Formation isolation valves are typically ball valves used to isolate reservoir fluids, and lubricator valves, including subsea lubricator valves, are the topmost valve on a Christmas tree that provides access to a wellbore. Each of these valves includes surfaces that move relative to one another, which subjects these surfaces to wear or various forms of degradation.

BRIEF SUMMARY

One aspect of the present disclosure includes a flow control valve. The valve includes a first surface movably engaged with a second surface. A coating is on the first surface. The coating includes at least a first layer. The coating is characterized by: a coefficient of friction of less than 0.15 in dry condition; a hardness in excess of 1,200 HVN; impermeability to liquids at pressures ranging from 15 and 20,000 psi; a surface finish of 63 or less; and a thickness ranging from 0.5 to 20 mils.

Another aspect of the present disclosure includes a material construction. The material construction includes a first layer. The first layer includes at least two immiscible phases, including from 70 to 99 volume percent of a continuous phase and from 1 to 30 volume percent of a discontinuous phase dispersed within the continuous phase, each based on a total volume of the first layer. The discontinuous phase includes a solid dry lubricant. The continuous phase includes Ni and Co in an amount ranging from 50 to 70 wt. %, Cr in an amount ranging from 16 wt. % to 30 wt. %, Mo in an amount ranging from 2.5 wt. % to 10 wt. %, W in an amount ranging from 0 wt. % to 4 wt. %, and Fe in an amount ranging from 0 wt. % to 15 wt. %, each based on a total weight of the continuous phase.

Another aspect of the present disclosure includes a method of depositing a coating onto a surface of a valve. The method includes depositing a first layer of a coating onto a surface of a valve. The first layer is deposited using electroplating, electroless plating, thermal spraying, or cladding. The method includes depositing a second layer of the coating onto a surface of the first layer. The second layer is deposited using one of the same process as the first layer, or sputtering, ion beam, plasma enhanced chemical vapor deposition, cathodic arc, or chemical vapor deposition. The second layer may be optional and may include a sub-layer.

BRIEF DESCRIPTION OF THE DRAWINGS

So that the manner in which the features of the compositions, articles, systems and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1 depicts a monolayer coating applied to an apparatus, in accordance with certain aspects of the present disclosure.

FIG. 2 depicts a multilayer (bilayer) coating applied to an apparatus, in accordance with certain aspects of the present disclosure.

FIG. 3 depicts two monolayer coatings applied to two surfaces that are movably engaged, in accordance with certain aspects of the present disclosure.

FIG. 4 depicts a monolayer coating applied to a surface that is movably engaged with another surface that is uncoated, in accordance with certain aspects of the present disclosure.

Figure 6:
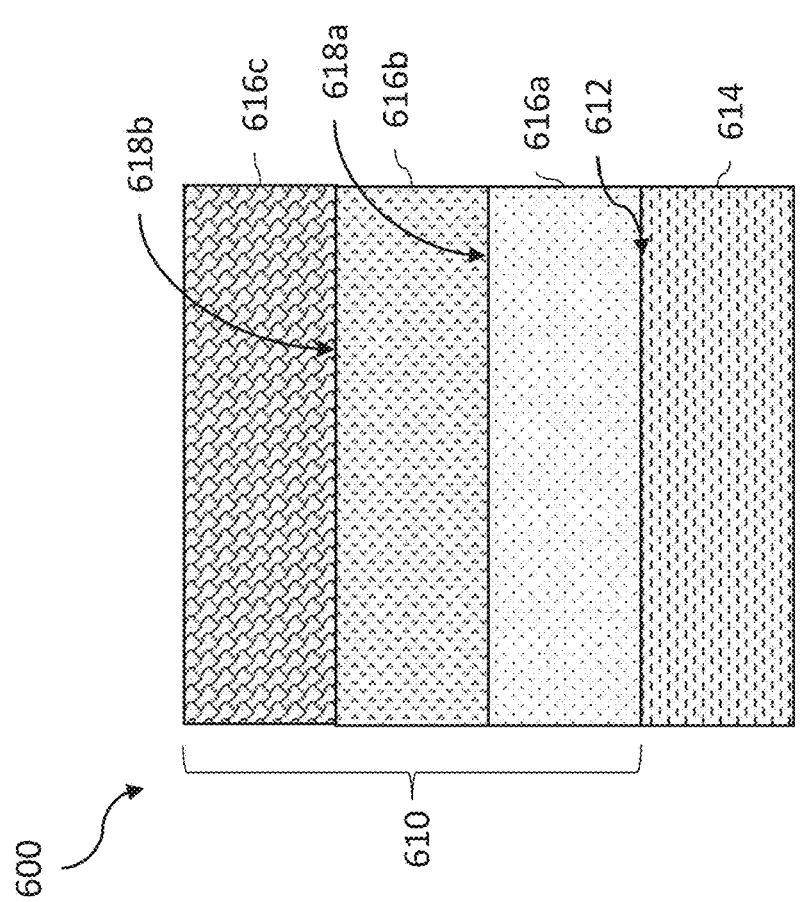
FIG. 6 depicts a multilayer (tri-layer) coating applied to an apparatus, in accordance with certain aspects of the present disclosure.

Compositions, articles, systems, and methods according to present disclosure will now be described more fully with reference to the accompanying drawings, which illustrate various exemplary embodiments. Concepts according to the present disclosure may however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

The present disclosure provides for hard and lubricious material compositions; apparatus and systems, such as valve surfaces, including the same; and to methods of making and using the same, including sequences of manufacturing the same.

In certain aspects, the present disclosure provides for improvements in the performance of apparatus (e.g., valves and other components) that are subjected to corrosive, abrasive and/or otherwise relatively harsh operating conditions. Such improved performance is attained by modifying and/or treating the apparatus or the surface thereof to have desired surface characteristics. The surface characteristics include, but are not limited to, lubricity, hardness, inertness, or combinations thereof. Each of lubricity, hardness and inertness may at least partially provide an apparatus with various performance enhancements such as a longer lifespan (extended service capabilities), elimination or reduction of leak paths and leak rates, and other performance enhancements. In the context of this disclosure, the term inertness is synonymous with an elevated general corrosion resistance, including the absence of any perceived participation in any chemical or electrochemical reaction between the material composition and surrounding fluid in the conditions of use. A layer is formed typically by a single individual process within an fixed equipment in a fixed set-up or fixture. A sub-layer may be formed as part of such process within a fixed equipment in a fixed set-up or fixture. A typical sublayer may include new chemistries, or mixed chemistries between the base material or part and the subsequent layer. While sublayers are not detailed herein, one skilled in the art would understand that such sublayers may be utilized in the material constructions disclosed herein to modify the coating performance.

Material Compositions and Constructions

Certain aspects of the present disclosure include material compositions, constructions and arrangements, and applications thereof onto surfaces that are movably engaged (i.e., surfaces that are in contact and move relative to one another during operation of the apparatus). The material constructions may be in the form of coatings or films applied to at least one of the surfaces that are movably engaged. With reference to FIG. 1, exemplary coated surface 100 is depicted. Coated surface 100 includes coating 110 applied to surface 112 of apparatus 114. Apparatus, or surface 112 thereof, may be composed of any of various materials including, but not limited to, carbon steel, low-alloy-steel, stainless steel, or a superalloy (e.g., a superalloy of nickel or cobalt). While shown and described herein as a coating, the material construction disclosed herein is not limited to being in the form of a coating. Coating 110 is a monolayer coating, including a single coating layer 116, having a thickness 111. However, the coatings disclosed herein are not limited to monolayer coatings, and may include multilayer coatings, such as coating 210 shown in FIG. 2. Throughout the present disclosure, like (but modified) reference numerals indicate like parts. For example, in FIG. 1 the coated surface is identified via reference numeral 100, while in FIG. 2 the coated surface is identified via reference numeral 200. Coated surface 200 is substantially identical, in arrangement, to coated surface 100, with the exception that coating 210 is a bilayer coating, including coating layer 216*a* applied to surface 212 of apparatus 214 and coating layer 216*b* applied to surface 218 of coating layer 216*a*. Coating layer 216*b* has thickness 213.

Surface 112 or 212 of apparatus 114 or 214 may be a surface that is typically in moving contact with another surface, such as a surface on a movable portion of valve (e.g., the ball of a ball valve). As such, the coatings, or other forms of the material composition, disclosed herein may provide a protective barrier to the underlying surface of the particular apparatus.

As shown in FIG. 3, each surface that is in moving contact may be coated with either a coating in accordance with the present disclosure or another coating. FIG. 3 depicts coated surface 300*a* in moving contact with coated surface 300*b*. Surface 318*a* of coating 310*a* is shown slightly separated from surface 318*b* of coating 310*b* for the purpose of clarity; however, one skilled in the art would understand that, during operation, surfaces 318*a* and 318*b* may be in at least partial contact while moving relative to one another. While apparatus 314*a* and 314*b* are shown and described as different apparatus, apparatus 314*a* and 314*b* may be different surfaces of a single apparatus.

As shown in FIG. 4, in some aspects only one of the surfaces that is in moving contact may be coated with either a coating in accordance with the present disclosure or another coating. FIG. 4 depicts coated surface 400, including coating 410 on apparatus 414*a*. Surface 418 is in moving contact with surface 412 of uncoated apparatus 414*b*. Surface 418 of coating 410 is shown slightly separated from surface 412 of apparatus 414*b* for the purpose of clarity; however, one skilled in the art would understand that, during operation, surfaces 418 and 412 may be in at least partial contact while moving relative to one another. As discussed in more detail elsewhere herein, apparatus 114, 214, 314*a*, 314b, 414a, and 414b may be any of numerous apparatus that, when in operation, have surfaces in moving contact with one another or with a surface of another apparatus.

Material Composition and Coating Properties

The coatings or other material constructions disclosed herein may exhibit and/or cause the surfaces to which the coatings are applied to exhibit one or more physical, mechanical, and/or chemical properties or characteristics, including surface properties or characteristics.

The coatings (or other material constructions) disclosed herein may be inert and/or cause the surfaces to which the coatings are applied to be inert. In some such aspects, the material composition (and coatings and constructions thereof) are sufficiently inert such that the composition is corrosion resistance or substantially corrosion resistant. For example, a valve surface having a coating in accordance with the present disclosure applied thereon may exhibit corrosion resistance when operating in relatively harsh and/or high temperature environments, such as when operating in a downhole or subsea environment with corrosive fluids flowing therethrough or otherwise in contact therewith. In certain aspects, the coatings and/or surfaces to which the coatings are applied exhibit a corrosion resistance that is equal to or greater than the corrosion resistance exhibited by tungsten carbide (WC) spray coatings that contain 10 wt. % Co and 4 wt. % Cr, such as AMDRY® 5843, WOKA® 3903, PMET 86-10-4 (Polymet), among others, which are used in flow-control valves and may constitute a reference or benchmark that is limited by operations in harsh environments. One skilled in the art would understand that there are numerous standards for measuring corrosion resistance, including a salt spray test, such as in accordance with ASTM B-117 Salt Spray/Salt Fog.

The coatings (or other material constructions) disclosed herein may exhibit lubricity and/or cause the surfaces to which the coatings are applied to exhibit lubricity. The lubricity provided by the material compositions and constructions herein may be sufficient to provide for low-friction engagement between two surfaces, where at least one of the surfaces has the material composition and construction thereon. For example, the lubricity provided by the material compositions and constructions disclosed herein may provide for ease of valve actuation. In some such aspects, the coatings (or other material constructions) and/or surfaces to which the coatings are applied exhibit a kinetic coefficient of friction (CoF) of less than 0.15, or less than 0.04, or from 0.04 to 0.15, when measured with both surfaces in a dry condition. For example, coatings applied to valve seats and/or valve rings may exhibit a CoF of less than 0.15, and coatings applied to bearings may exhibit a CoF of less than 0.07. As such, the material compositions disclosed herein will reduce the actuation torque required to actuate a valve (e.g., the force required to open a linear valve, such as downhole flow control valve). CoF may be measured in accordance with ASTM G99-17, Standard Test Method for Wear Testing with a Pin-on-Disk Apparatus, using a stainless-steel pin. CoF measurements disclosed herein were derived from the average of measurements over a 20 min test duration.

The coatings (or other material constructions) disclosed herein may exhibit hardness and/or cause the surfaces to which the coatings are applied to exhibit hardness. For example, such coatings or surfaces may exhibit a hardness equal to or in excess of 1200 Hardness Vickers Number (HVN). For example, certain aspects provide for a ball or seat of a valve (e.g., a ball valve) having a hardness in excess of 1200 HVN. As would be understood by one skilled in the art, HVN may be determined in accordance with ASTM E384-17 or ISO 6507-1. Hardness provides surfaces, and the underlying apparatus, with erosion-resistance and wear-resistance, such as abrasive wear resistance, including scratch resistance. Hardness also results in surfaces, and underlying apparatus, having eliminated or at least reduced leak paths.

The coatings (or other material constructions) disclosed herein may exhibit relatively high adhesion properties. In certain aspects, such coatings exhibit adhesion that is equal to or greater than the adhesion exhibited by high velocity oxygen fuel (HVOF) sprayed tungsten carbide coatings. For example, in some such aspects, such coatings or surfaces exhibit a bond strength of equal to or greater than 10 ksi. The relatively high adhesion properties of the coatings provide the coatings with minimal elongation under load. In certain aspects, the coatings exhibit an elongation in excess of 0.2%. ASTM C633-13(2017): Standard Test Method for Adhesion or Cohesion Strength of Thermal Spray Coatings is one exemplary method for measuring adhesion. For elongation of materials, ASTM E8: Standard Test Methods for Tension Testing of Metallic Materials is one exemplary testing method.

The coatings (or other material constructions) disclosed herein may be impermeable, or substantially impermeable, to liquids at pressures ranging from 1 atm and 20,000 psi, or 1 psi to 20,000 psi, or 10 psi to 19,000 psi, or 100 psi to 18,000 psi, or 1,000 psi to 17,000 psi, or 5,000 psi to 15,000 psi, or 10,000 psi to 12,000 psi. In some aspects, in order not to permeate and allow corrosive fluid through the coating and thereunder, the coatings herein present no interconnected porosity and, in some aspects, are pore-free or substantially pore-free at the macro-and micron scale. While not limiting, one ASTM standard that may be used in determining porosity is ASTM E2109-01(2014): Standard Test Methods for Determining Area Percentage Porosity in Thermal Sprayed Coatings.

In some such aspects, the coatings (or other material constructions) disclosed herein have a thickness that is sufficient to provide the coatings with impermeability to liquids at such pressures. The thickness of the coatings may be sufficient to reduce or eliminate the presence of defects, such as porosity (holidays) and cracks (including interconnected cracks). The coatings may have a thickness (e.g., thickness 111 in FIG. 1) ranging from 0.4 to 15 mils, or of at least 0.5 mils, or from 1 to 10 mils, or from 1 to 8 mils, or from 2 to 6 mils, or from 3 to 5 mils, or of at most 10 mils. For example, a coating applied to a ball or seat of a ball valve may have a thickness of up to 6 mil, or up to 10 mils, or from 6 to 10 mils. A coating applied to a bearing may have a thickness of 1 mil or at least 1 mil. While not limiting, thickness may be measured by methods, including those that are destructive to the coating. One such method includes ASTM D4138-07a(2017): Standard Practices for Measurement of Dry Film Thickness of Protective Coating Systems by Destructive, Cross-Sectioning Means. Another method is ASTM D7091 Practice for Nondestructive Measurement of Dry Film Thickness of Nonmagnetic Coatings Applied to Ferrous Metals and Nonmagnetic, Nonconductive Coatings Applied to Non-Ferrous Metals.

The coatings (or other material constructions) disclosed herein have a surface finish of 63 or less, 50 or less, or 40 or less μin. As would be understood by one skilled in the art, surface finish may be measured with a contact profilometer (stylus), non-contact profilometer (scanning interferometry, confocal microscopy, scanning laser microscope), or a variety of other methods. While not limiting, surface finish may be measured using ASTM A480, ASME B46.1-2002, ISO 4287, and ISO 4288.

The material compositions and coatings (or other material constructions) disclosed herein may macroscopically, exhibit relatively high uniformity in both the chemical and physical properties exhibited thereby. Thus, the chemical and physical properties exhibited by the material compositions and coatings (or other material constructions) may be invariant or substantially invariant over the entire surface area thereof and/or throughout the entire volume thereof. For example, the inertness, lubricity, hardness, adhesion properties, impermeability, thickness, and/or surface finish of the coatings may be invariant over the entire surface area thereof and/or throughout the entire volume thereof.

Coatings—Monolayer

Certain aspects of the disclosure include monolayer coatings, material compositions thereof, apparatus coated therewith, and methods of making, applying, and using the same.

Figure 5:
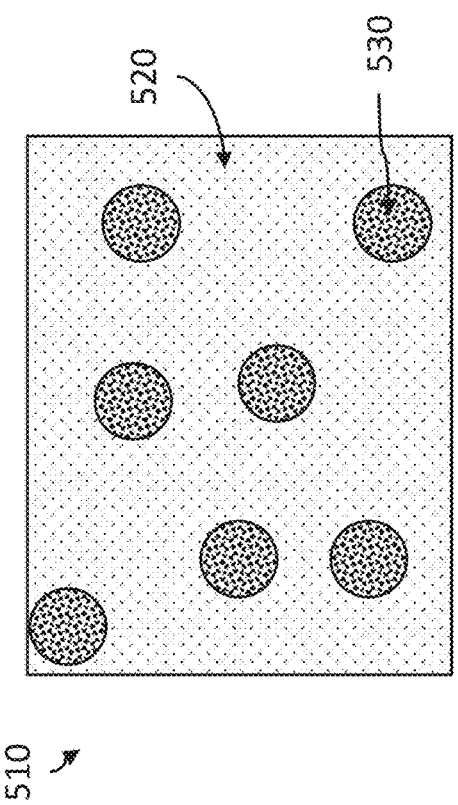
FIG. 5 depicts an exemplary multiphasic material composition suitable for use in at least one layer of the coatings, in accordance with certain aspects of the present disclosure.

In some such aspects, the single layer of the coating, such as coating layer 116 of FIG. 1, includes at least two distinct and immiscible phases or components. FIG. 5 depicts an exemplary monolayer coating 510 having two distinct and immiscible phases, including continuous phase 520 (binder phase) and discontinuous phase 530 (dispersed phase). While discontinuous phase 530 is shown as distributed throughout continuous phase 520 in a substantially random arrangement, in some aspects, discontinuous phase 530 is evenly distributed throughout continuous phase 520, such that spacing between particles of discontinuous phase 530 is consistent or substantially consistent through continuous phase 520.

The discontinuous, granular phase 530 of coating 510 may have a particle size ranging from 0.5 to 150 μm, or from 1 to 100 μm, or from 10 to 80 μm, or from 30 to 70 μm, or combinations of these with resulting particle distributions being modal or bi-modal. The discontinuous, granular phase 530 may be present in the coating layer in an amount ranging from 1 to 30 volume percent, or 5 to 25 volume percent, or from 10 to 15 volume percent, based on the total volume of the coating layer. The discontinuous phase may include more than a single type, shape, or chemistry of embedded particles. Discontinuous phase 530 most typically include a solid dry lubricant with function to decrease friction. Thus, in some such aspects, the continuous phase of the monolayer coating may be present in the coating layer in an amount ranging from 70 to 99 volume percent, or 75 to 95 volume percent, or from 85 to 90 volume percent, based on the total volume of the coating layer. In some aspects, the particles or grains of the discontinuous phase 530 have an aspect ratio of from 1 (e.g., for spherical, cubic, etc. shaped particles or grains) to 100 (e.g., for cylindrical or rolling fiber shaped particles or grains).

Continuous phase 520 may be or include a predominant, transition-metal binder phase that is characterized as an electrically fully interconnected phase of coating 510 to result in electrically conductive coating. An "electrically fully interconnected phase" may be a phase capable of conducting an electrical current, where discontinuities with non-conductive phases are absent or substantially absent. Continuous phase 520 may have a single or predominantly single-phase material. In some such aspects, continuous phase 520 may have a crystalline structure, such as a face-centered cubic structure. Continuous phase 520 may be or include Ni, Co, Cr, Mo, W, Fe, or combinations thereof. Ni and Co, combined, may be present in continuous phase 520 in an amount that is equal to or greater than 50 wt. %, or from 50 to 70 wt. %, or from 55 to 65 wt. %, or equal to or less than 70 wt. %, each based on the total weight of continuous phase 520. Cr may be present in continuous phase 520 in an amount that is equal to or greater than 16 wt. %, or from 16 wt. % to 30 wt. %, or from 20 wt. % to 25 wt. %, or equal to or less than 30 wt. %, each based on the total weight of continuous phase 520. Mo may be present in continuous phase 520 in an amount that is equal to or greater than 2.5 wt. %, or from 2.5 wt. % to 10 wt. %, or from 4 wt. % to 8 wt. %, or from 5 wt. % to 6 wt. %, or equal to or less than 10 wt. %, each based on the total weight of continuous phase 520. W may be present in continuous phase 520 in an amount that is equal to or less than 4.0 wt. %, or from 0 wt. % to 4 wt. %, or from 1 wt. % to 3 wt. %, or from 1.5 wt. % to 2.5 wt. %, or equal to or greater than 0 wt. %, each based on the total weight of continuous phase 520. Fe may be present in continuous phase 520 in an amount that is equal to or less than 15.0 wt. %, or from 0 wt. % to 15 wt. %, or from 1 wt. % to 12 wt. %, or from 2 wt. % to 10 wt. %, or equal to or greater than 0 wt. %, each based on the total weight of continuous phase 520. One skilled in the art would understand that other elements may be present within continuous phase 520, whether intentional or unintentional, including in trace amounts. In some such aspects, the composition of continuous phase 520 satisfies the following pitting resistance equivalent number (PREN) value rule: 1 wt. % Cr+3.3% Mo+0.5% W+16N≥30; where the value of "30" is set by critical pitting correlation for stainless steels, not Ni-rich alloys, with the criteria that no pitting occurs at ambient temperature as a lower boundary condition. For nickel alloys, a minimum PREN value of 30 corresponds to minimum critical pitting temperature of approximately 30° C. as measured by ASTM G48 in 6% $FeCl_3$ solution, and this PREN is approximately suitable for many applications involving de-aerated seawater.

Solid Lubricants

In some aspects, the material composition disclosed herein includes solid lubricants, including layered thin-films and/or particulates of solid lubricants. Thus, solid lubricants may form a part of a composite material or coating in accordance with the present disclosure. In some aspects, solid lubricants are present in a layer as an additive to that layer, while in other aspects the solid lubricants form the bulk or entirety of the coating layer. Solid lubricants suitable for use in the present disclosure include, but are not limited to, soft metals; transition metal dichalcogenides; oxides, including binary oxides and ternary oxides; alkaline-earth fluorides; boron nitride (hexagonal boron nitride, hBN); MAX phases; carbon or carbon-based materials; or combinations thereof.

Soft metals suitable for use as solid dry lubricants herein include, but are not limited to, Ag, Pb, Au, In, Cu, and alloys thereof. Such soft metals may be present within a coating layer or material composition in an amount of at least 5 wt. %, or from 5 to 30 wt. %, or from 10 to 25 wt. %, or at most 30 wt. %, each based on the total weight of the coating layer or material composition. As many soft metals are susceptible to general corrosion, and may be costly, careful selection of soft metals is desirable.

Transition metal dichalcogenides (TMDs) suitable for use as solid dry lubricants herein include, but are not limited to, $MoS_2$, $WS_2$, and $MoSe_2$. Such TMDs may be present within a coating layer or material composition in an amount of at least 5 wt. % based on the total weight of the coating layer or material composition. Several of these sulfides disclosed herein are effective in reducing friction in dry conditions, as well as conditions where water is present as minority phase in the flow.

Binary oxides suitable for use as solid dry lubricants herein include, but are not limited to, PBO, $MoO_3$, $WO_3$, CuO, $V_2O_5$, $Re_2O_7$, $B_2O_3$, $Al_2O_3$, $ZrO_2$, $Fe_2O_3$, FeO, and MgO. Such binary oxides may be present within a coating layer or material composition in an amount of at least 5 wt. %, or from 5 to 35 wt. %, or from 10 to 30 wt. %, or from 15 to 25 wt. % or at most 35 wt. %, each based on the total weight of the coating layer or material composition. At least some of these oxides disclosed herein offer benefits under high-load applications; and at least some the oxides disclosed herein are reactive to water and therefore limited to applications where water is absent or a minority phase.

Ternary oxides suitable for use as solid dry lubricants herein include, but are not limited to, $Ag_2MoO_4$, $Ag_2WO_4$, and $Ag_3VO_4$. Such ternary oxides may be present within a coating layer or material composition in an amount of at least 5 wt. %, or from 5 to 35 wt. %, or from 10 to 30 wt. %, or from 15 to 25 wt. % or at most 35 wt. %, each based on the total weight of the coating layer or material composition.

Alkaline-earth fluorides suitable for use as solid dry lubricants herein include, but are not limited to, $CaF_2$ and $BaF_2$.

Boron nitrides suitable for use as solid dry lubricants herein include, but are not limited to, hexagonal boron nitride (hBN). Such boron nitrides may be present within a coating layer or material composition in an amount of at least 5 wt. %, or from 5 to 50 wt. %, or from 10 to 45 wt. %, or from 15 to 40 wt. %, or from 20 to 35 wt. %, or from 25 to 30 wt. %, or from 35 to 50 wt. %, or at most 35 wt. %, or at most 50 wt. %, each based on the total weight of the coating layer or material composition.

As would be understood by one skilled in the art, MAX phases are layered, hexagonal carbides and nitrides having the general formula: $M_{n+1}AX_n$, where n=1 to 3, M is an early transition metal, A is an A-group (mostly IIIA and IVA, or groups 13 and 14) element, and X is either carbon and/or nitrogen. MAX phases suitable for use as solid dry lubricants herein include, but are not limited to, $Ti_3SiC_2$ or $Ti_2SnC$, which are inert.

Carbon and carbon-based materials suitable for use as solid dry lubricants herein include, but are not limited to: diamond, including diamond like carbon (DLC) and ultra-nanocrystalline diamond; carbon nanotubes; fluorenes; graphene; graphene oxide; graphite; graphite composites, such as Cu-graphite composites; and tetrahedral amorphous carbon. Such carbon and carbon-based materials may be present within a coating layer or material composition in an amount of at least 5 wt. %, or from 5 to 35 wt. %, or from 10 to 30 wt. %, or from 15 to 25 wt. %, or at most 35 wt. %, each based on the total weight of the coating layer or material composition (by surface). In some such aspects, the distance between grains in the microstructure of such carbon-based solid lubricants is comparable to or smaller than that in erosion and abrasive particles used in oilfields, such as sand. The material grain size of such carbon-based solid lubricants is smaller than that of sand particles used in oilfields as erosion and abrasive particles.

Solid dry lubricants may exhibit any of various wear/friction mechanisms, including: interlayer shear and water intercalation; high chemical inertness and repulsive forces due to hydrogen termination; tribochemically induced surface reaction and termination of top carbon atoms; tribochemically induced reaction with H, O, or OH interlayer shear and transfer film formulation; and interlayer shear and prevention of tribocorrosion. Solid dry lubricants may be applied via any of various application methods, including: evaporation, including thermal evaporation; pyrolysis; sputtering, including RF and DC sputtering; ion beam; chemical vapor deposition (CVD), including plasma enhanced CVD (PECVD), microwave plasma CVD (MPCVD), and hot filament CVD (HFCVD); cathodic arc, pulsed laser, atomic laser deposition (ALD); and exfoliation, including chemical exfoliation and mechanical exfoliation.

Coatings—Multilayer

Certain aspects of the disclosure include multilayer coatings, material compositions thereof, apparatus coated therewith, and methods of making, applying, and using the same. In some such aspects, the multilayer coatings, such as coating 210 of FIG. 2, includes at least two distinct layers. The multilayer coatings disclosed herein may include more than two layers. In some aspects, a first layer of the multilayer coating (e.g., layer 216*a* in FIG. 2) is the same or substantially the same as the coating layer described herein with reference to the monolayer coating, or is the same or substantially the same as the continuous binder phase described herein with reference to the monolayer coating. The first layer may be the innermost layer of the multilayer coating (i.e., the layer positioned closest to the underlying apparatus and not exposed). The first layer may be applied (e.g., onto a surface of the apparatus) via electroplating or electroless plating.

A second layer of the multilayer coating (e.g., layer 216*b* in FIG. 2) may be applied over the first layer. Second coating layer 216*b* has a thickness (thickness 213 in FIG. 2) of at least 2 μm, or from 2 to 40 μm, or from 5 to 35 μm, or from 10 to 30 μm, or from 15 to 25 μm, or at most 40 μm thick. Second coating layer 216*b* may contain carbon. In some such aspects, second coating layer 216*b* contains equal to or greater than 30 wt. % C, based on the total weight of second coating layer 216*b*. The material composition of second coating layer 216*b* may be or include DLC; a transition-metal carbide compound, such as TiC, Ti(C,N), or WC; or a silicon (non-transition metal) carbide, including amorphous or semi-amorphous.

In some aspects, the multilayer coatings disclosed herein include more than two layers. With reference to FIG. 6, coated surface 600 on apparatus 614 is depicted, including three-layer coating 610 applied thereto. Coating 610 includes first layer 616*a* applied to surface 612 of apparatus 614, which may be the same or similar to first layer 216*a*. Coating 610 includes second layer 616*b* applied to surface 618*a* of first layer 616*a*. Second layer 616*b* may be the same or similar to second layer 216*b*. Coating 610 includes third layer 616*c* applied to surface 618*b* of second layer 616*b*. In some aspects, third layer 616*c* is a solid-lubricant layer, such as a sulfide layer. For example, the material composition of third layer 616*c* may be or include $MOS_2$, $TiC_xS_y$, TiCS/Se/Te, $WS_2$, or any of the solid dry lubricants disclosed herein.

Applications

The material compositions disclosed herein may be applied to the surfaces of any of various apparatus in the form of a coating or other material construction. The material compositions disclosed herein are particularly suitable for application to surfaces that are in contact while moving relative to one another.

Figure 7:
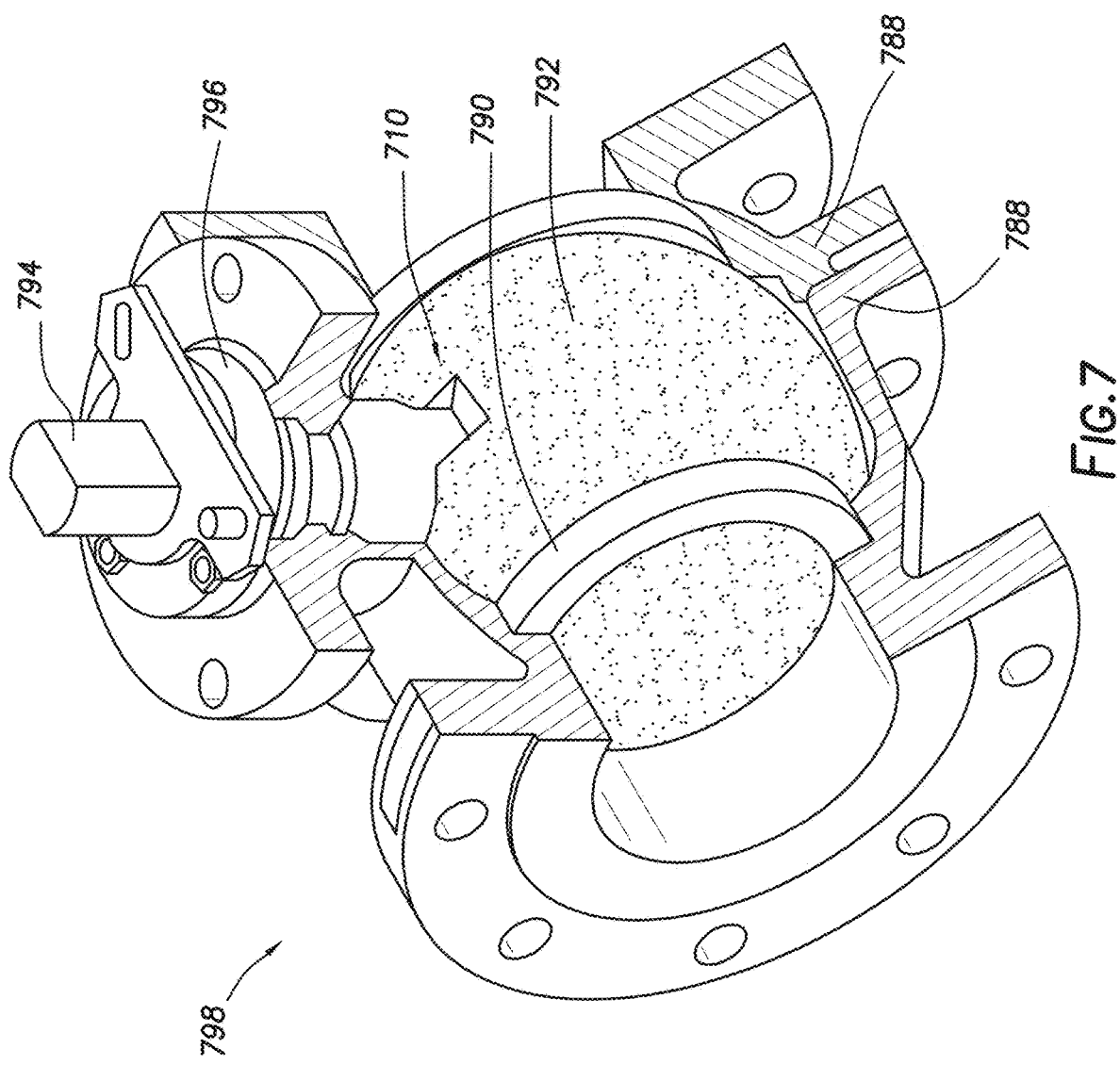
FIG. 7 depicts a ball valve including a surface having a coating applied thereto, in accordance with certain aspects of the present disclosure.

Exemplary parts or apparatus that include surfaces that are in contact and move relative to one another include valves. For example, the present material compositions may be applied to one or more surfaces of a ball valve (e.g., a rotary actuated ball valve), such as on the surface of a ball of a ball valve, the surface of a seat of a ball valve, the surface of a bearing of a ball valve, or combinations thereof. In operation, with the material composition applied to surfaces of a ball valve (e.g., to the ball and/or seat), actuation of the ball valve (i.e., pivoting of the ball) may be eased in comparison to an otherwise identical ball valve without the material composition applied thereto. That is, less force (lower torque) is required to be applied to cause the ball to move between the open and closed positions than would be required in an otherwise identical ball valve without the material composition applied thereto. The material composition may also provide the ball valve, when applied thereto, with eliminated or reduced leakage of fluids over time (i.e., reduced leakage of the fluids flowing through the ball valve). FIG. 7 depicts an exemplary ball valve 798, including bearing 796, stem 794, ball 792, seat 790, and body 788. While only ball 792 is shown as including coating 710 thereon, other portions of ball valve 798 may include the coating, such as bearing 796 and seat 790.

Other valves upon which the coatings disclosed herein may be applied include, but are not limited to, downhole valves, such as flow control valves, safety valves, formation isolation valves, and subsea lubricator valves. In any such valves, the coatings disclosed herein may provide for reduced actuation power (e.g., reduced amount of piston force required to actuate linear control valves). In some such aspects, the coatings disclosed herein may be applied to sleeve-bearing assemblies (sliding sleeve assemblies) and/or sliding pistons of flow control valves, the inner and outer diameters of flow tubes of downhole safety valves, or other portions of the valves where surfaces are in contact and move relative to one another. While not specifically shown, one skilled in the art would understand that apparatus 114, 214, 314*a*, 314*b*, 414*a*, 414*b* and 614 are representative of portions of any of such apparatus. As one skilled in the art would understand the components and function of such valves, the components of such parts of the operation thereof are not detailed herein.

When applied to surfaces of flow control valves, the coatings may provide for lower actuation forces in various corrosive and sandy (abrasive and erosive) operating conditions. For example, the coating may be applied to portions of flow control valves, including sliding sleeve assemblies, that are used to control flow downhole (production and/or injection flow). The coating may be applied to flow control valves, including sliding pistons, that are used to adjust flow.

When applied to surfaces of safety valves, the coatings may provide for lower actuation forces, such as in the case of the presence of scale deposits, as well as providing for the reduced occurrence of corrosion. For example, the coating may be applied to the inner and outer diameters of the flow-tube of a safety valve.

Thus, certain aspects of the present disclosure include a flow control valve. The valve includes a first surface movably engaged with a second surface (i.e., the surfaces are in contact and move relative to one another during operation of the valve). A coating is on the first surface, the second surface, or combinations thereof. The coating includes at least a first layer. The coating is characterized by: a coefficient of friction of less than 0.15; a hardness in excess of 1,200 HVN; impermeability to liquids at pressures ranging from 15 and 20,000 psi; a surface finish of 63 or less; and a thickness ranging from 0.5 to 20 mils. The coating may be further characterized by: inertness and corrosion resistance; a bond strength to the first surface of equal to or greater than 10 ksi; or combinations thereof. In one exemplary embodiment, the present disclosure provides for a flow-control valve that includes a ball-seat assembly (ball valve), a gate-seat assembly (gate valve), a sleeve-bearing assembly (sliding sleeve), or a linear/rotating piston flow tube-sleeve/housing assembly having at least one surface that is coated in accordance with the present disclosure, where the surface is a surface that is in contact with at least one other surface and moves relative to that other surface during operation of the flow-control valve and is characterized by: (1) being a monolayered or multilayered coating; (2) being impermeable to liquid at pressures ranging from 15 to 20,000 psi; (3) having a thickness of from 0.5 and 20 mils; (4) having a hardness in excess of 1200 HVN; (5) having a CoF of less than 0.15, in dry condition; (6) having a surface finish of 63 or less; (7) or combinations thereof.

The present coatings may be applied to any of various surface of parts used in surface, subsea, and downhole drilling operations, including parts through which corrosive fluids flow or otherwise contact.

Method of Applying Material Compositions to Surfaces

Figure 8C:
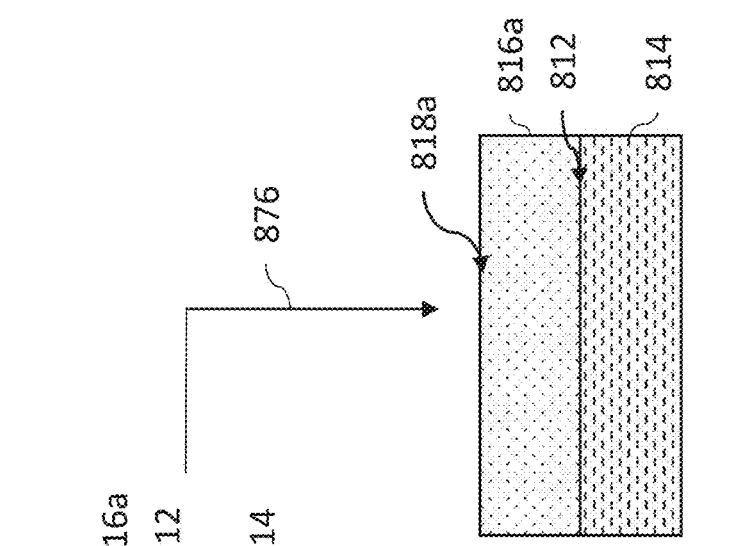
FIGS. 8A-8D depict an uncoated apparatus being sequentially treated to form a coated apparatus, in accordance with certain aspects of the present disclosure.
Figure 8A:
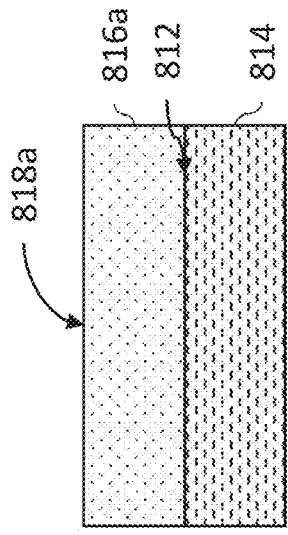
Figure 8B:
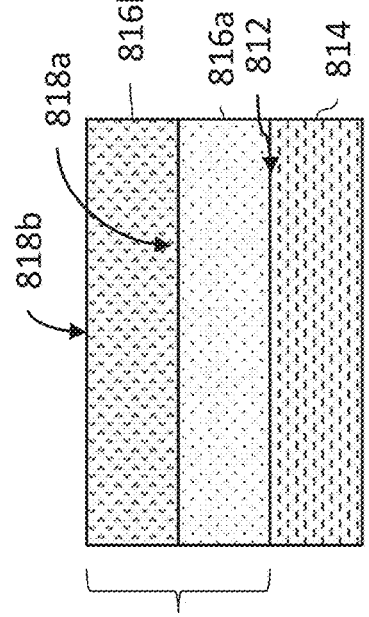
Figure 8D:
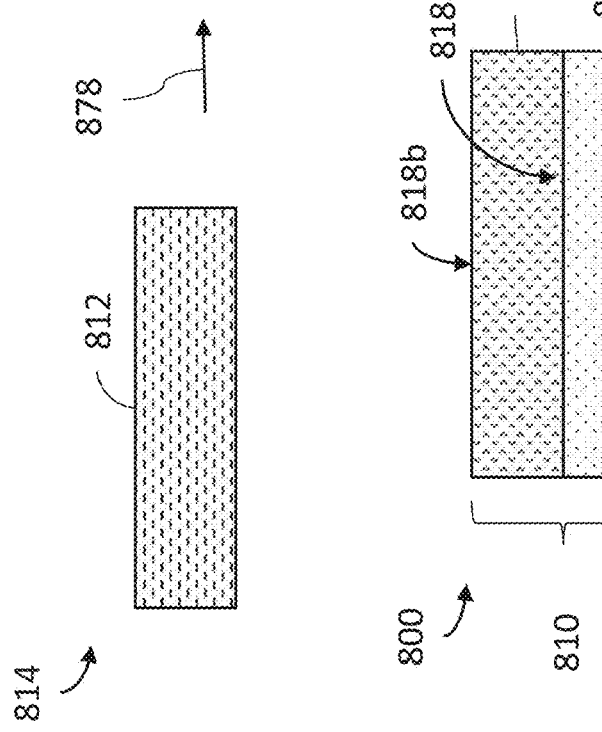

Certain aspects of the present disclosure provide for a method of making coated apparatus. In some such aspects, the method includes a sequence of coating deposition processes or steps that includes: (1) applying a first layer of the coating via electroplating, electroless plating, thermal spraying, cladding, or applying carbide cloth (e.g., CONFORMA CLAD®); and then, (2) applying a second layer of the coating via sputtering, ion beam, PECVD, cathodic arc, CVD, or another thin film deposition process. In some such aspects, the sequence includes optionally performing a surface preparation step to the surface of the first layer, after applying the first layer and before applying the second layer of the coating. The surface preparation step may include cleaning the surface, honing the surface, polishing the surface, or combinations thereof. For example, FIGS. 8A-8D depict a coated apparatus 800, the same or similar as that shown in FIG. 2, being formed by such a sequence of steps. In FIG. 8A, uncoated apparatus 814 is provided. Moving from FIG. 8A to FIG. 8B, first layer 816*a* is coated onto surface 812 of apparatus 814 via coating application 878, such as electroplating, electroless plating, thermal spraying, cladding, or applying carbide cloth. Moving from FIG. 8B to FIG. 8C, surface 818*a* is subjected to surface preparation 876, such as cleaning, honing, and/or polishing. Moving from FIG. 8C to FIG. 8D, second layer 816*b* is applied to surface 818*a* via second coating application 874, such as via sputtering, ion beam, PECVD, cathodic arc, CVD, or another thin film deposition process. Thus, uncoated apparatus 814 is treated to form coated apparatus 800, including coating 810 with surface 818*b*.

Material Constructions

Figure 9:
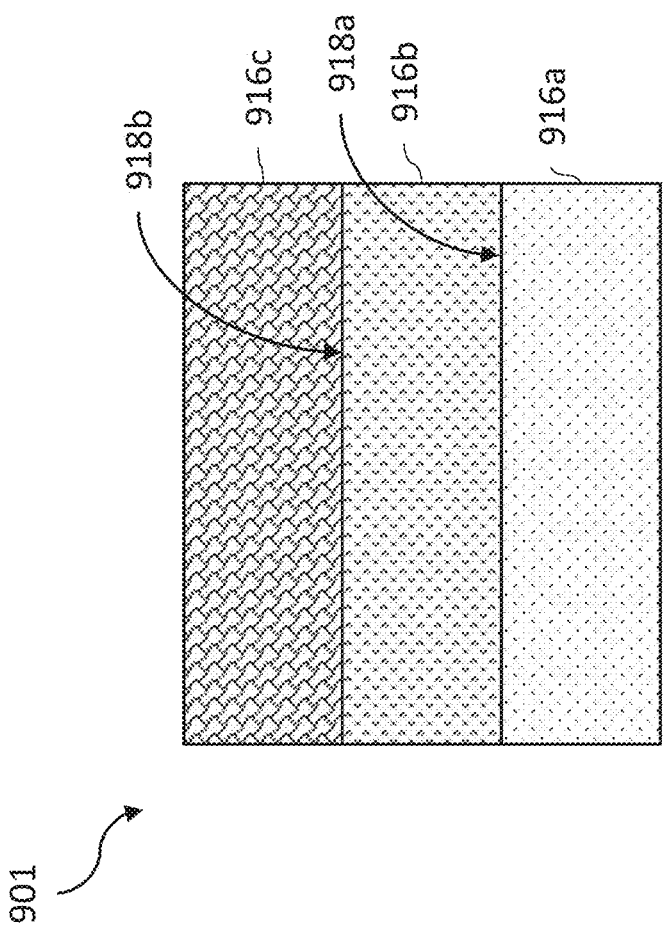
FIG. 9 depicts a three-layer material construction, in accordance with certain aspects of the present disclosure.

In some aspects, the present disclosure provides for material constructions, whether applied to or in isolation of an underlying apparatus, including methods of making, applying, and using the same. The material constructions may be the same or substantially the same as the mono-, bi-, and tri-layer coatings shown and described with reference to FIGS. 1-8D, and may include any number of layers or discrete components, such as one, two, three, or more than three. With reference to FIG. 9, material construction 901 is depicted. Material construction 901 includes three-layers, including first layer 916a, which may be the same or similar to first layer 616a; second layer 916b applied to surface 918a of first layer 916a, which may be the same or similar to second layer 616b; and third layer 916c applied to surface 918b of second layer 916b, which may be the same or similar to third layer 616c.

Figures 10A, 10B:
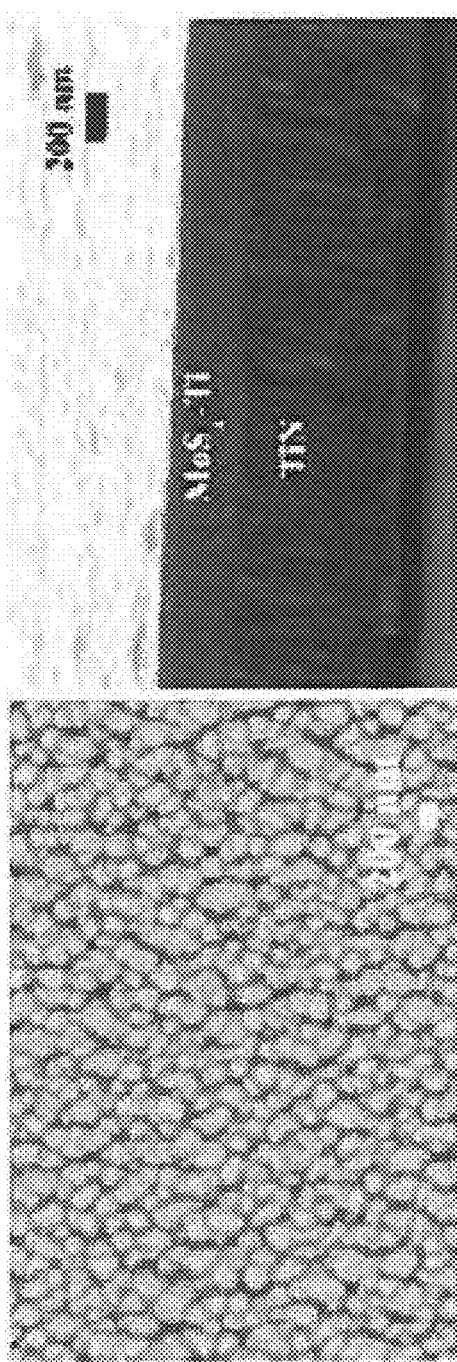
FIG. 10A is an exemplary, high magnification electron micrograph of a top view showing the surface structure of a coating at the submicron scale, in accordance with the present disclosure.
FIG. 10B is an exemplary, high magnification electron micrograph side, cross-sectional view of the coating of FIG. 10A showing the two layers of the coating.

FIGS. 10A and 10B depict two exemplary, high magnification electron micrographs. FIG. 10A is a top view showing the surface structure of a coating at the submicron scale, in accordance with the present disclosure, and FIG. 10B is a side view, cross-section of the coating of FIG. 10A showing the two layers of the coating.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A valve comprising:
    a first surface movably engaged with a second surface; and
    a coating on the first surface, the coating comprising:
        a first layer including at least two immiscible phases, including from 70 to 99 volume percent of a continuous phase and from 1 to 30 volume percent of a discontinuous phase dispersed within the continuous phase, each based on a total volume of the first layer;
        wherein the discontinuous phase comprises a solid dry lubricant; and
        wherein the continuous phase comprises a transition-metal.

2. The valve of claim 1, wherein the continuous phase has a face-centered cubic structure, wherein the continuous phase comprises Ni, Co, Cr, Mo, W, Fe, or combinations thereof.

3. The valve of claim 2, wherein the continuous phase comprises Ni and Co in an amount ranging from 50 to 70 wt. %, Cr in an amount ranging from 16 wt. % to 30 wt. %, Mo in an amount ranging from 2.5 wt. % to 10 wt. %, W in an amount ranging from 0 wt. % to 4 wt. %, and Fe in an amount ranging from 0 wt. % to 15 wt. %, each based on a total weight of the continuous phase.

4. The valve of claim 2, wherein a composition of the continuous phase satisfies the following pitting resistance equivalent number value rule: 1 wt. % Cr+3.3% Mo+0.5% W+16N≥30.

5. The valve of claim 1, wherein particles of the discontinuous phase have a particle size ranging from 0.5 to 150 μm and an aspect ratio of from 1 to 100.

6. The valve of claim 1, wherein the solid lubricant comprises one of a soft metal, a transition metal dichalcogenide, a binary oxide, a ternary oxide, an alkaline-earth fluoride, boron nitride, a MAX phase, carbon, or a carbon-based material.

7. The valve of claim 6, wherein the solid dry lubricant comprises Ag, Pb, Au, In, Cu, MoS2, WS2, MoSe2, PBO, MoO3, WO3, CuO, V2O5, Re2O7, B2O3, Al2O3, ZrO2, Fe2O3, FeO, MgO, Ag2MoO4, Ag2WO4, Ag3VO4, CaF2, BaF2, hexagonal boron nitride, Ti3SIC2, Ti2SnC, diamond, diamond like carbon, ultra-nanocrystalline diamond, carbon nanotubes, fluorenes, graphene, graphene oxide, graphite, graphite composite, or tetrahedral amorphous carbon.

8. The valve of claim 1, further comprising a second layer applied over a surface of the first layer, wherein the second layer comprises at least 30 wt. % carbon.

9. The valve of claim 8, wherein the second layer is deposited using electroplating, electroless plating, thermal spraying, cladding, sputtering, ion beam, plasma enhanced chemical vapor deposition, cathodic arc, or chemical vapor deposition.

10. The valve of claim 8, further comprising a third layer applied over a surface of the second layer, wherein the third layer includes a solid lubricant layer.

11. The valve of claim 10, wherein the third layer comprises a sulfide.

12. The valve of claim 11, wherein the third layer comprises MOS2, TICXSY, TiCS/Se/Te, or WS2.

13. The valve of claim 1, wherein the first layer is deposited using electroplating, electroless plating, thermal spraying, or cladding.

14. The valve of claim 13, wherein a second layer is deposited on a surface of the first layer using electroplating, electroless plating, thermal spraying, cladding, sputtering, ion beam, plasma enhanced chemical vapor deposition, cathodic arc, or chemical vapor deposition.

15. An apparatus for use in hydrocarbon production, the apparatus comprising:
    a first surface movably engaged with a second surface; and
    a coating on the first surface, the coating comprising:
        a first layer, wherein the coating is characterized by:
            a coefficient of friction of less than 0.15;
            a hardness in excess of 1,200 HVN;
            impermeability to liquids at pressures ranging from 15 and 20,000 psi;
            a surface finish of 63 or less; and
            a thickness ranging from 0.5 to 20 mils, and wherein the first layer includes at least two immiscible phases, including from 70 to 99 volume percent of a continuous phase and from 1 to 30 volume percent of a discontinuous phase dispersed within the continuous phase, wherein the discontinuous phase comprises a solid dry lubricant, and wherein the continuous phase comprises a transition-metal.

16. The apparatus of claim 15, further comprising a second layer applied over a surface of the first layer, wherein the second layer comprises at least 30 wt. % carbon.

17. The apparatus of claim 16, further comprising a third layer applied over a surface of the second layer, wherein the third layer includes a solid lubricant layer.

18. The apparatus of claim 17, wherein the coating is applied to a part used in an operation that includes a corrosive fluid.

19. The apparatus of claim 18, wherein the operation is one of a subsea operation, a surface operation, or a downhole drilling operation.

20. An apparatus for use in hydrocarbon production, the apparatus comprising:
- a first surface movably engaged with a second surface; and
- a coating on the first surface, the coating comprising:
    - a first layer including at least two immiscible phases, including from 70 to 99 volume percent of a continuous phase and from 1 to 30 volume percent of a discontinuous phase dispersed within the continuous phase, each based on a total volume of the first layer;
    - wherein the discontinuous phase comprises a solid dry lubricant; and
    - wherein the continuous phase comprises a transition-metal.

* * * * *